(12) United States Patent
Stuart et al.

(10) Patent No.: US 7,155,827 B2
(45) Date of Patent: Jan. 2, 2007

(54) METHOD FOR VERIFYING PREDETERMINED BEARING PRELOAD OF DIFFERENTIAL ASSEMBLY MODULE

(75) Inventors: Edward Eugene Stuart, Payne, OH (US); Timothy Bernard Allmandinger, Roanoke, IN (US); Sean Karl Hoefer, Wabash, IN (US); Earl James Irwin, Fort Wayne, IN (US); Parvinder Singh Nanua, Fort Wayne, IN (US); Gregory James Maser, Fort Wayne, IN (US)

(73) Assignee: Torque-Traction Technologies, LLC., Maumee, OH (US)

( * ) Notice: Subject to any disclaimer, the term of this patent is extended or adjusted under 35 U.S.C. 154(b) by 509 days.

(21) Appl. No.: 10/695,900

(22) Filed: Oct. 30, 2003

(65) Prior Publication Data

US 2005/0091851 A1    May 5, 2005

(51) Int. Cl.
  *B21D 53/10* (2006.01)
  *F16H 57/02* (2006.01)
  *F16H 48/06* (2006.01)
(52) U.S. Cl. .............................. 29/898.09; 29/407.09; 29/407.1; 74/607; 180/378
(58) Field of Classification Search ............. 29/407.09, 29/407.1, 446, 462, 898.07, 898.09; 74/607, 74/606 R; 180/378, 379; 301/109, 110, 301/137; 475/220
See application file for complete search history.

(56) References Cited

U.S. PATENT DOCUMENTS

| | | | |
|---|---|---|---|
| 1,076,559 A | 10/1913 | Duffy | |
| 1,076,560 A | 10/1913 | Duffy | |
| 3,269,214 A * | 8/1966 | Nagel | 74/607 |
| 3,412,631 A * | 11/1968 | Frost | 475/205 |
| 3,792,625 A | 2/1974 | Asberg | |
| 4,310,200 A * | 1/1982 | Olender | 301/129 |
| 4,530,144 A * | 7/1985 | Hagelthorn | 29/407.1 |
| 4,841,802 A * | 6/1989 | Peck | 74/607 |
| 5,115,558 A * | 5/1992 | Bernhardt et al. | 29/705 |
| 5,271,294 A * | 12/1993 | Osenbaugh | 74/607 |
| 5,297,855 A * | 3/1994 | Jeng | 301/124.1 |
| 5,328,159 A * | 7/1994 | Kaufman et al. | 267/52 |
| 6,068,571 A * | 5/2000 | Irwin | 475/230 |
| 6,227,716 B1* | 5/2001 | Irwin | 384/583 |
| 6,257,090 B1* | 7/2001 | Arakawa et al. | 74/607 |
| 6,402,655 B1* | 6/2002 | Irwin et al. | 475/231 |
| 6,409,626 B1* | 6/2002 | Irwin | 475/230 |

(Continued)

FOREIGN PATENT DOCUMENTS

WO    WO 03/080366 A2    10/2003

Primary Examiner—Essama Omgba
(74) Attorney, Agent, or Firm—Berenato, White & Stavish (57) ABSTRACT

A rigid drive axle assembly includes a support beam member having a substantially flat central plate section, a differential assembly module secured to the central plate section through at least two threaded studs extending from the central plate section. The differential assembly module includes a differential carrier frame member having two bearing hubs receiving differential bearings. A method for verifying a predetermined bearing preload of the differential assembly module comprises the steps of preloading the differential bearings to the predetermined bearing preload, inserting mounting bores in the bearing hubs of the frame member onto the mounting studs, and determining that the differential bearings are properly preloaded if the mounting studs are received in the mounting bores in the differential carrier frame member without substantial resistance, or determining that the differential bearings are not properly preloaded if the mounting studs may not be received in the mounting bores easily.

20 Claims, 8 Drawing Sheets

U.S. PATENT DOCUMENTS

| | | | |
|---|---|---|---|
| 6,418,613 B1 * | 7/2002 | Rode | 29/714 |
| 6,450,914 B1 * | 9/2002 | Irwin et al. | 475/230 |
| 6,460,268 B1 * | 10/2002 | Hoefer | 33/645 |
| 6,497,027 B1 * | 12/2002 | Irwin | 29/407.01 |
| 6,553,865 B1 * | 4/2003 | Endreszl | 74/607 |
| 6,729,207 B1 * | 5/2004 | Allmandinger et al. | 74/607 |
| 6,736,544 B1 * | 5/2004 | DeWald | 384/626 |
| 6,796,031 B1 * | 9/2004 | Russell | 29/898.09 |
| 6,865,809 B1 * | 3/2005 | Vorbeck | 29/893.1 |
| 2001/0024989 A1 | 9/2001 | Morse et al. | |
| 2004/0149078 A1 * | 8/2004 | Melton et al. | 74/607 |
| 2005/0096173 A1 * | 5/2005 | Allmandinger et al. | 475/220 |

* cited by examiner

METHOD FOR VERIFYING PREDETERMINED BEARING PRELOAD OF DIFFERENTIAL ASSEMBLY MODULE

BACKGROUND OF THE INVENTION

1. Field of the Invention

The present invention relates to drive axle assemblies for motor vehicles and methods for assembling the same in general, and more particularly to a method for verifying predetermined bearing preload of a differential assembly module during the operation of mounting the differential assembly module to a support beam member of the drive axle assembly.

2. Description of the Prior Art

Drive axle assemblies are in common use in most motor vehicles. Such axle assemblies include a number of components that are adapted to transmit rotational power from an engine of the motor vehicle to wheels thereof. Typically, the drive axle assembly includes a hollow axle housing, a differential assembly, which is rotatably supported within the axle housing by a non-rotating differential carrier. The differential assembly drivingly couples an input drive shaft extending from the vehicle engine and a pair of output axle shafts extending to the vehicle wheels. Typically, the axle shafts are contained in respective non-rotating tubes of the axle housing. Thus, rotation of a gear mechanism of the differential assembly by the drive shaft causes corresponding rotation of the axle shafts.

Typically, a differential case of the differential assembly is rotatably supported by the differential carrier through a pair of single row tapered roller bearings adapted to accurately center the differential case within the differential carrier and accurately position a ring gear relative to a drive pinion. Proper engagement of the ring gear carried by the differential case with the driving pinion is necessary for proper operation. The differential case must rotate with considerable precision, lest the ring gear will not mesh properly with a drive pinion gear of a final drive assembly and thereby produce noise and excessive wear. To achieve this precision, the differential case and the differential carrier must not only be machined accurately, but the bearings must be set properly to a condition of an appropriate, predetermined preload where no radial or axial end play exists in the differential case. The preload in the bearings imparts rigidity to the differential case, but too much preload will cause the bearings to overheat and fail prematurely. On the other hand, too little preload may cause the bearings to acquire the end play, and this likewise decreases the life of the bearings and introduces radial and axial play into the differential case.

Generally, the prior art differential case bearings have been made adjustable by means of adjustment shims or threaded sleeve adjusters used to provide the predetermined preload on the differential case bearings according to manufacturer's specification.

Typically, the differential case bearings are disposed within the differential carrier and preloaded to the predetermined preload prior to mounting the differential case within the differential carrier. The accuracy of the differential bearing preload depends largely on a workmen's experience. After that, the assembled differential carrier is fastened to an axle housing of the drive axle.

Unfortunately, common assembly problems do affect differential bearing preload, such as: (1) improper fitting or misalignment of either the outer bearing race rings into the differential carrier bore or the inner bearing race rings onto the differential case, (2) presence of foreign particles in or about the race rings, and (3) workmen's skill in wrongly controlling compression to obtain the predetermined preload as a result of torquing the threaded sleeve adjusters. If such problems are not detected prior to putting the differential assembly into service, it will have a useful life significantly shortened, and often irreparable damage could be done requiring replacement of bearings or other components.

However, if the differential bearing assemblies are not properly preloaded, then it is practically impossible to verify the accuracy of the bearing preloading during the process of assembling the drive axle. When it is realized during the testing or operation of the drive axle that the differential bearings are not properly preloaded, the axle has to be disassembled, the differential carrier dismantled from the axle housing and the preload of the differential bearings has to be adjusted. It may require several disassembling-reassembling operations before the correct bearing preload is achieved. Such labor-intensive procedures add cost and complexity to the drive axle manufacturing procedure.

Thus, there is a need for a method for verifying a predetermined bearing preload of the differential assembly during the process of assembling of the drive axle that enables plant personnel to quickly determine differential bearing preload conditions to see if they all fall within specific design parameters, thus preventing premature axle failure and enhancing reliability of the differential assembly.

SUMMARY OF THE INVENTION

The present invention provides a novel method for verifying a predetermined bearing preload of differential bearings in a differential assembly module during the mounting thereof to a drive axle assembly. The drive axle assembly in accordance with the preferred embodiment of the present invention is a rigid drive axle assembly and comprises a support beam member having a substantially flat, enlarged central plate section and two opposite arm sections extending axially outwardly from the central plate section. The flat enlarged central section is further provided with a central opening therethrough. It will be appreciated that the present invention is equally applicable to independent drive axle assemblies, and may be used for both front and rear axle applications.

The drive axle assembly further comprises a differential assembly module fastened to the enlarged central plate section of the support beam member, and two opposite axle shaft members outwardly extending from the differential assembly module, and rotatably supported by the arm sections of the support beam member so that the axle shaft members are spaced from the central plate section of the support beam member in a driving direction of the motor vehicle. Distal ends of the axle shaft members are provided with flange members adapted for mounting corresponding wheel hubs. The differential assembly module is enclosed into a housing formed by a rear cover and a front cover secured to opposite surfaces of the central plate section of the beam member.

The differential assembly module includes a differential carrier frame member fastened to the central plate section of the support beam member, and provided for rotatably supporting a differential case and a drive pinion. The differential case houses a conventional differential gear mechanism, well known to those skilled in the art. The drive pinion has a pinion gear in continuous meshing engagement with a ring gear, and a pinion shaft operatively coupled to a vehicular drive shaft driven by a vehicular powerplant. The differential assembly module is enclosed into a housing formed by a rear cover and a front cover secured to opposite surfaces of the central plate section of the beam member in any appropriate manner well known in the art. The front cover has a front opening for rotatably supporting and receiving therethrough a distal end of the pinion shaft of the drive pinion. The rear cover incorporates two opposite through holes for receiving the axle shaft members therethrough. Each of the through holes is provided with a self-centering seal.

The differential carrier frame member is, preferably, a single-piece metal part manufactured by casting or forging. The differential carrier frame member has a generally Y-shaped configuration and includes a neck portion and two opposite, axially spaced, coaxial bearing hub portions attached to the neck portion through respective leg portions. The neck portion has an opening therethrough adapted for receiving and rotatably supporting the drive pinion through appropriate anti-friction bearings, preferably roller bearings. The bearing hub portions are provided with respective openings therethrough adapted for receiving appropriate anti-friction bearings for rotatably supporting the differential carrier, and threaded adjusting rings provided for preloading the anti-friction bearings of the differential assembly module to a predetermined bearing preload in accordance with a manufacturer's specification. Moreover, the bearing hub portions are provided with mounting flange portions having mounting bores.

The differential assembly module is secured to the central plate section of the central plate section of the support beam member through at least two threaded studs extending from the central plate section. In an assembled condition, the threaded studs extend through the mounting bores in the differential carrier frame member, and fastened to the central plate section of the beam member with the complementary nuts. A geometric location of the mounting studs is substantially complementary to the location of the mounting bores of the mounting flange portions of the differential carrier frame member in a preloaded condition.

A method for verifying a predetermined bearing preload of the differential assembly module comprises the steps of preloading the differential bearings to the predetermined bearing preload, inserting mounting bores in the bearing hubs of the frame member onto the mounting studs, and determining that the differential bearings are properly preloaded if the mounting studs are received in the mounting bores in the differential carrier frame member without substantial resistance, or determining that the differential bearings are not properly preloaded if the mounting studs may not be received in the mounting bores easily.

Therefore, the process in accordance with the present invention represents a novel method for verifying a predetermined bearing preload of a differential assembly module mounted to an axle support beam member of a drive axle. The present invention considerably simplifies assembling of the drive axle, reduces labor cost, improves the quality of the final product and enhances reliability of the differential assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. As used herein, the words "front" and "rear" in the following description are referred with respect to a driving direction of a motor vehicle (not shown), as indicated in the accompanying drawing figures by an arrow F.

Figure 1:
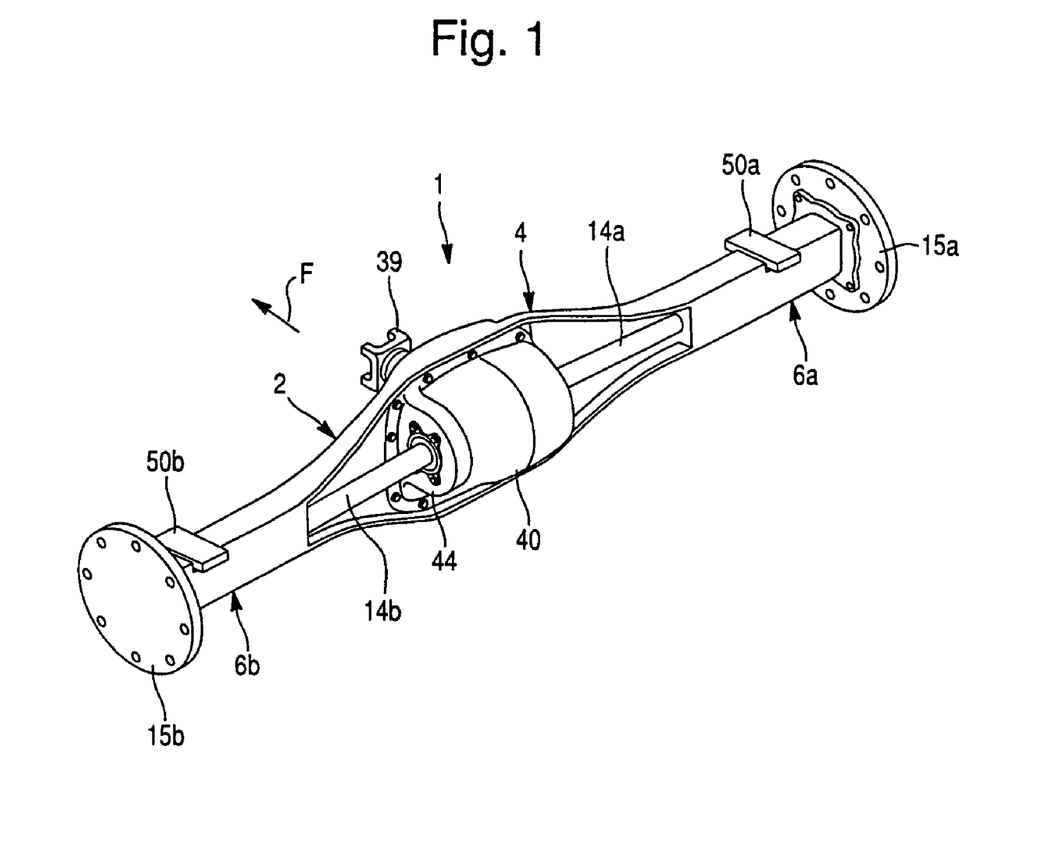
FIG. 1 is a perspective view from the rear of a drive axle assembly in accordance with the preferred embodiment of the present invention.
Figure 2:
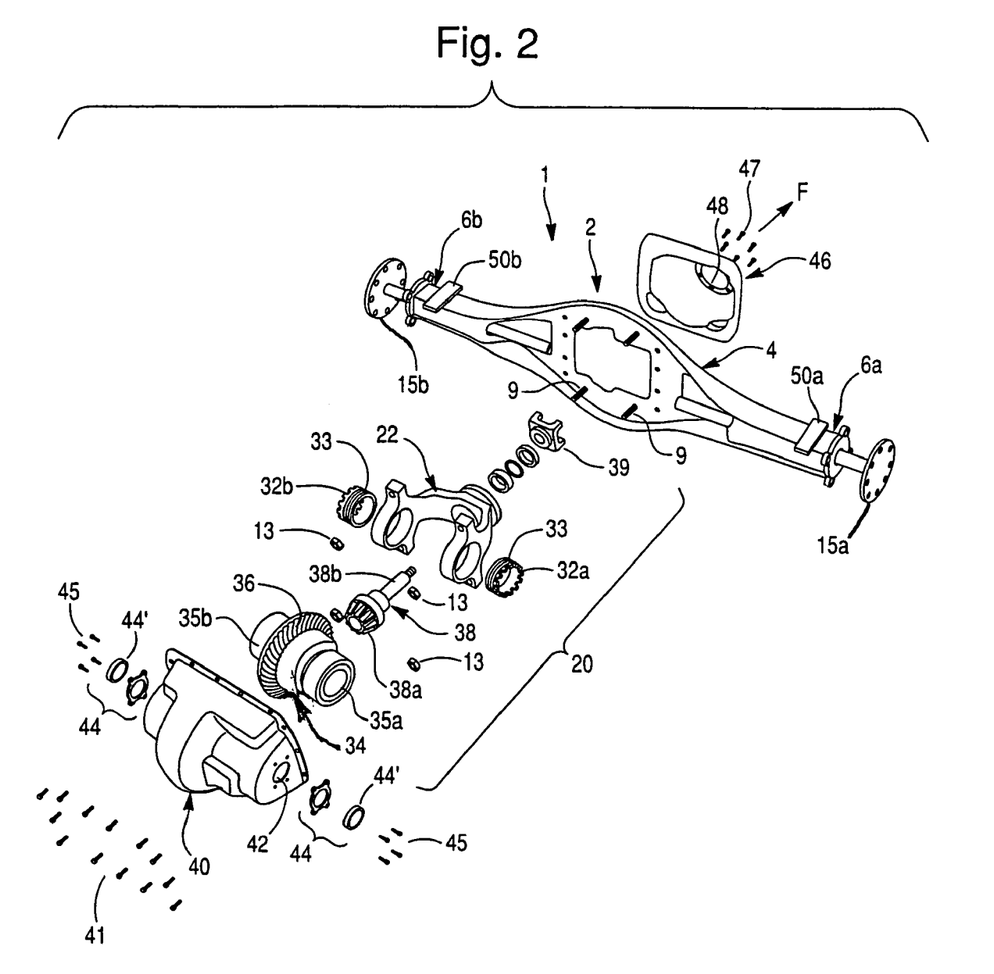
FIG. 2 is an exploded perspective view from the rear of the drive axle assembly in accordance with the preferred embodiment the present invention.

FIGS. 1–2 depict a vehicle rigid drive axle assembly 1 in accordance with the first exemplary embodiment of the present invention. It will be appreciated that the present invention is equally applicable to an independent drive axle assembly, and may be used for both front and rear axle applications.

The rigid drive axle assembly 1 comprises a support beam member 2 having a substantially flat, enlarged central plate section 4 and two opposite, substantially tubular arm sections 6a and 6b axially outwardly extending from the central plate section 4. As illustrated, the flat central plate section 4 of the support beam member 2 is in the form of a substantially vertically oriented flat plate and defines a support plane that is substantially orthogonal to the driving direction F of the motor vehicle. Preferably, the arm sections 6a and 6b are formed integrally with the central plate section 4.

Figure 5:
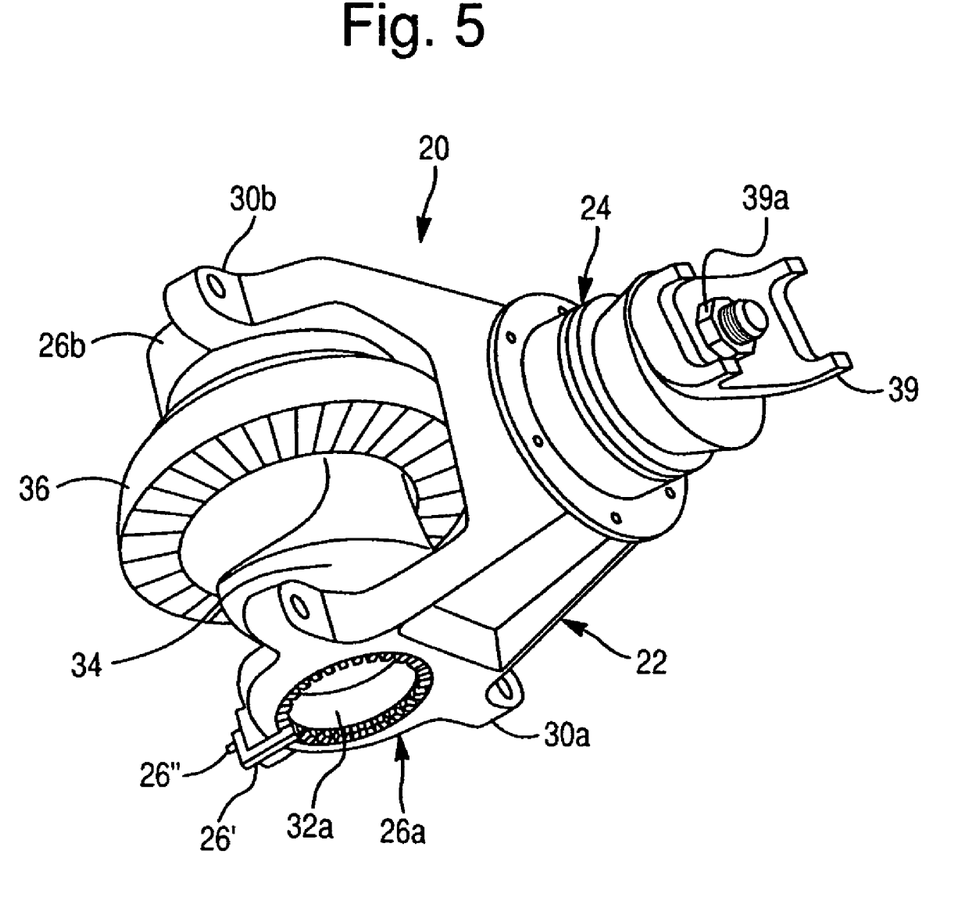
FIG. 5 is perspective view of a differential assembly module in accordance with the present invention.

The drive axle assembly 1 further comprises a differential assembly module 20 illustrated in detail in FIG. 5. The differential assembly module 20 is fastened to the enlarged central plate section 4 of the support beam member 2. Two opposite axle shaft members 14a and 14b outwardly extend from the differential assembly module 20 and are rotatably supported by the arm sections 6a and 6b of the support beam member 2 so that the axle shaft members 14a and 14b are spaced from the central plate section 4 of the beam member 2 in the driving direction F of the motor vehicle. Distal ends of the axle shaft members 14a and 14b are provided with flange members 15a and 15b, respectively, adapted for mounting corresponding wheel hubs (not shown).

The differential assembly module 20 includes a differential carrier frame member 22 fastened to the central plate section 4 of the beam member 2, and provided for rotatably supporting a differential case 34 and a drive pinion 38. The differential case 34 houses a differential gear mechanism, well known to those skilled in the art. The drive pinion 38 has a pinion gear 38a in continuous meshing engagement with a ring gear 36, and a pinion shaft 38b operatively coupled to a vehicular propeller shaft (not shown) driven by a vehicular powerplant (not shown), such as an internal combustion engine, through an input yoke 39. Alternatively, a mounting companion flange (not shown) may be attached to a distal end of the pinion shaft 38b (instead of the input yoke 39) for coupling the pinion shaft 38b to the vehicular propeller shaft driven by the vehicular powerplant. The ring gear 36 is conventionally secured to the differential case 34 in any appropriate manner well known in the art.

Therefore, the differential assembly module 20 of the present invention is a self-contained unit wherein the differential carrier frame member 22 supports all the significant elements of the differential assembly and a final drive, such as the differential case 34 housing the differential gear mechanism, anti-friction differential bearings 35a and 35b, adjusting rings 32a and 32b for adjustment of a bearing preload and/or proper positioning of the differential case 34 relative to the differential carrier frame member 22, locks for the adjusting rings 32a and 32b, oil seals, the drive pinion 38, drive pinion bearings, and the input yoke 39. The differential carrier frame member 22 of the present invention improves the modularity of design of the differential assembly, substantially simplifies the assembly and servicing of the differential assembly, and reduces the number of required machining operations.

Each of the adjusting rings 32a and 32b is provided with external threads 33 on an outer peripheral surface thereof, which are adapted to engage internal threads formed on the differential carrier frame member 22. An axially outwardly end of each adjusting ring 32a or 32b may be formed to receive a tool for turning the adjusting rings.

Figure 7:
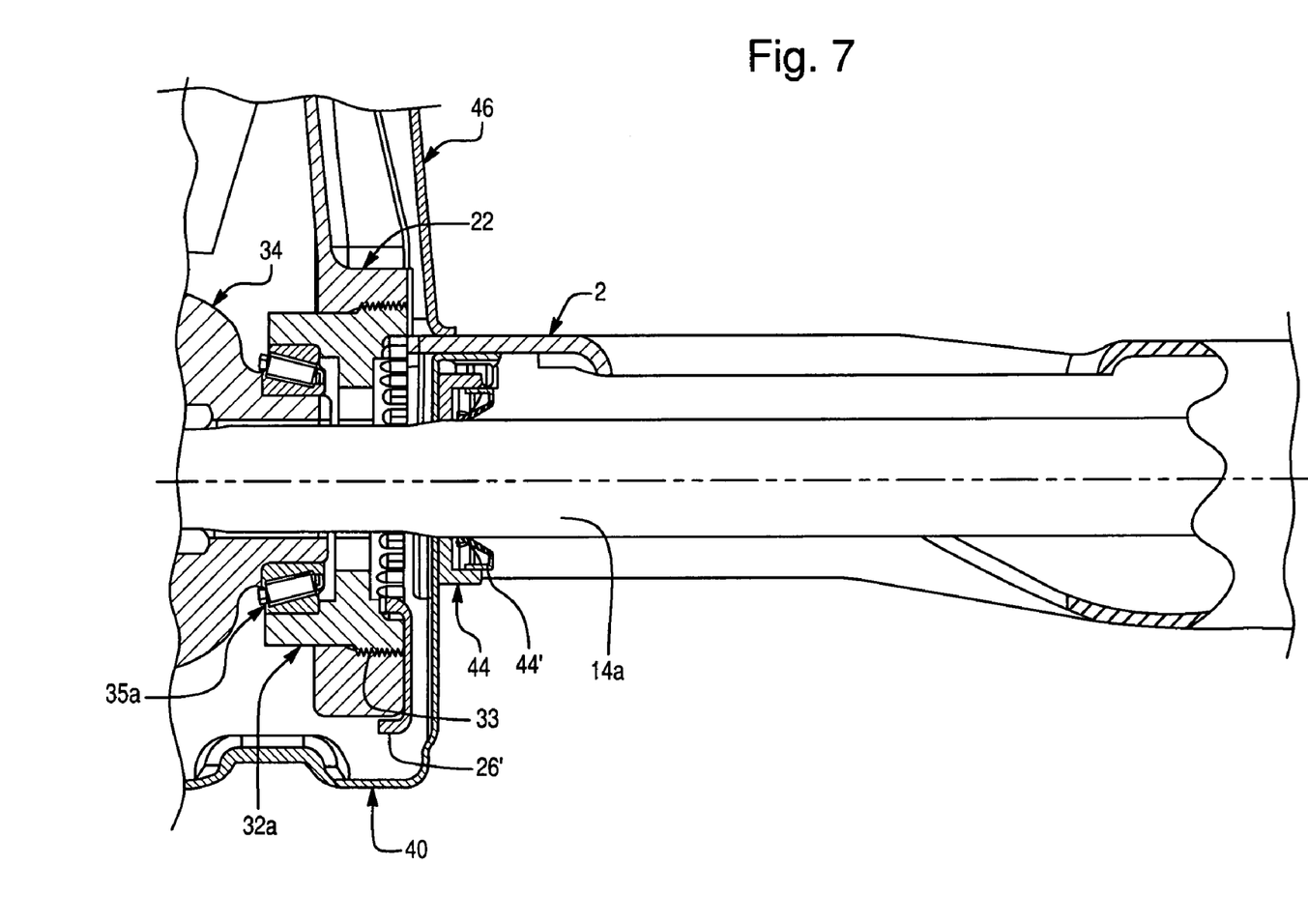
FIG. 7 is a partial sectional view of the drive axle assembly in accordance with the preferred embodiment of the present invention.

For adjustment and preloading of the differential bearings 35a and 35b, the adjusting rings 32a and 32b will be rotated so as to thread into or out of the differential carrier frame member 22 to selectively adjust the preload of the differential bearings 35a and 35b and position of the differential case 34 relative to the differential carrier frame member 22, as illustrated in FIG. 7.

Figure 3:
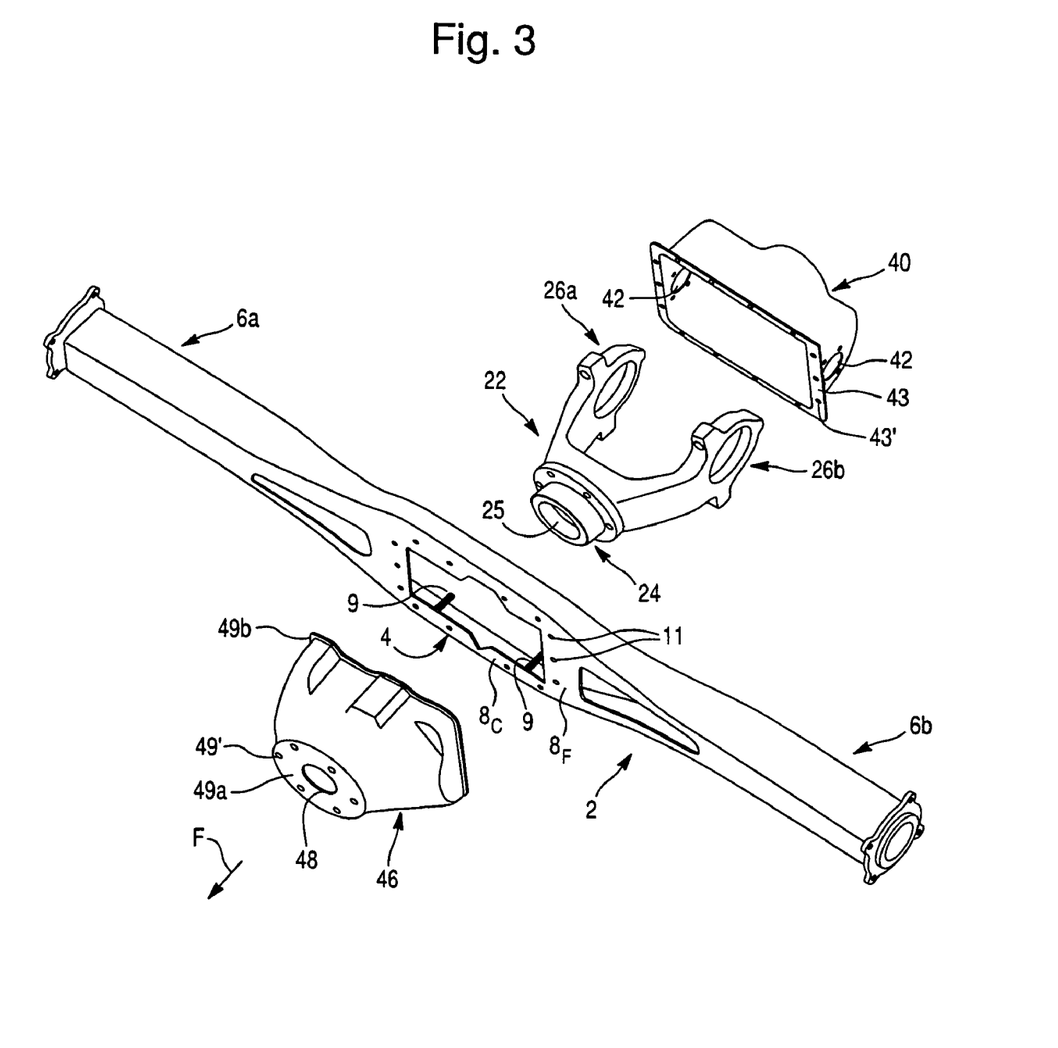
FIG. 3 is a partial exploded perspective view from the front of the axle assembly in accordance with the preferred embodiment the present invention.

In order to prevent the differential assembly module 20 from contamination and provide a supply of a lubricant, the differential assembly module 20 is enclosed into a housing formed by a rear cover 40 and a front cover 46 secured to opposite surfaces of the central plate section 4 of the beam member 2 in any appropriate manner well known in the art. In accordance with the preferred embodiment of the present invention, both the rear cover 40 and the front cover 46 are manufactured by metal stamping of any appropriate metal material, such as steel. Preferably, the front cover 46 is welded to a front surface of the central plate section 4 of the beam member 2, while the rear cover 40 is fastened to a rear surface of the central plate section 4 of the beam member 2 using conventional fasteners. The front cover 46 has a front opening 48 (shown in FIGS. 2 and 3) for receiving therethrough a distal end of the pinion shaft 38b of the drive pinion 38. As illustrated in FIG. 3, the front opening 48 is formed by a front flange collar 49a provided with a plurality of through holes 49' spaced apart substantially circumferentially, equidistantly around the front opening 48. The front cover 46 is further provided with a rear flange 49b adapted to juxtapose a front surface of the central plate section 4 of the beam member 2.

As shown in FIGS. 2 and 3, the rear cover 40 incorporates two opposite through holes 42 (only one is shown in FIG. 2) for receiving the axle shaft members 14a and 14b therethrough. Each of the through holes 42 is provided with an adjustable flange device 44 provided with an axle shaft seal 44' adapted to seal the through hole 42 about the axle shaft members 14a and 14b. The adjustable flange device 44 is secured to the rear cover 40 adjacent to the through hole 42 therein by a set of screws 45 and is adapted to adjust a position of the axle shaft seal 44' relative to the through hole 42 of the rear cover 40. The rear cover 40 is further provided with a mounting flange 43 adapted to juxtapose the rear mounting surface of the central plate section 4 of the beam member 2. As illustrated in FIG. 3, the mounting flange 43 of the rear cover 40 is provided with a plurality of spaced apart through holes 43'.

The opposite arm sections 6a and 6b of the support beam member 2 may be provided with spring seats 50a and 50b, respectively.

Figure 4A:
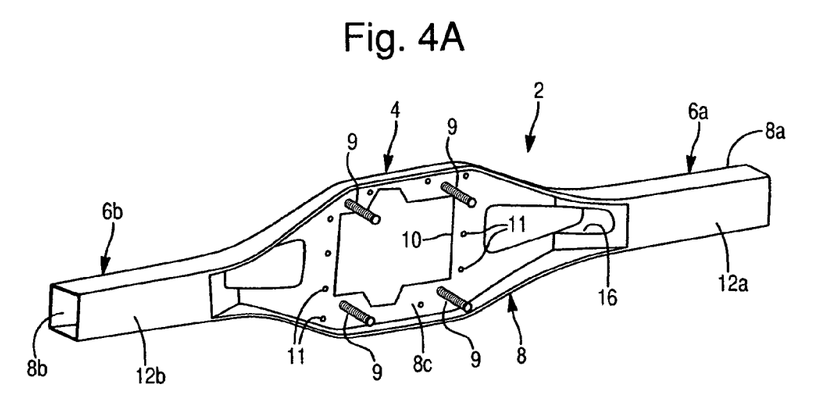
FIG. 4A is a perspective view of a support beam member of the axle assembly in accordance with the first exemplary embodiment of the present invention.

FIG. 4A depicts in detail the support beam member 2 in accordance with the first exemplary embodiment of the present invention. As was explained above, the support beam member 2 has the substantially flat, enlarged central plate section 4 and the two opposite, substantially tubular arm sections 6a and 6b axially outwardly extending from the central plate section 4. Preferably, in this embodiment, the support beam member 2 is formed of a single-piece C-channel body 8 manufactured by a metal deforming, such as stamping, having a substantially flat, enlarged central plate portion 8c and two opposite arm portions 8a and 8b axially outwardly extending from the central plate section 8c.

As illustrated in FIG. 4A, the flat central plate portion 8c of the body 8 is in the form of a substantially vertically oriented flat plate. The enlarged central plate portion 8c of the body 8 defines the central plate section 4 of the support beam member 2. The enlarged central plate portion 8c has substantially flat front and rear mounting surfaces $8_F$ and $8_R$, respectively. The central plate portion 8c is further provided with a central opening 10 therethrough adapted for receiving the differential carrier frame member 22 of the differential assembly module 20.

Furthermore, the central plate section 8c of the body 8 of the support beam member 2 is provided with a plurality of threaded mounting studs 9 fixed to the rear mounting surface $8_R$ of the central plate portion 8c, in combination with complementary internally threaded nuts 13. The mounting studs 9 extend rearwardly from the rear mounting surface $8_R$ of the central plate section 8c. Preferably, the mounting studs 9 extend substantially orthogonally to the rear mounting surface $8_R$ of the central plate portion 8c.

In addition, a plurality of smaller mounting holes 11 are formed in the central plate section 8c adjacent to the central opening 10 provided for receiving the screws 41 adapted to fasten the rear cover 40 to the central plate section 4 of the support beam member 2. Preferably, the mounting holes 11 are provided with threads complementary to threads of the screws 41. Alternatively, the mounting holes 11 may be smooth, and a plurality of bolts with complementary nuts (not shown) are provided in order to fasten the rear cover 40 to the flat central plate section 4 of the support beam member 2. Further alternatively, the mounting holes 11 may be smooth, and each of the mounting holes 11 is provided with a weld-on nut adapted to threadedly engage the complementary screws 41.

The support beam member 2 further includes two structural plates 12a and 12b attached to the arm sections 8a and 8b, respectively, in any appropriate manner, such as welding, so as to form the substantially tubular arm sections 6a and 6b of the support beam member 2 housing the axle shaft members 14a and 14b. As shown in FIG. 4A, the tubular arm sections 6a and 6b of the support beam member 2 have substantially rectangular cross-section. Inward ends of each of the structural plates 12a and 12b is provided with a notch 16 receiving the axle shaft member 14a or 14b therethrough in a spaced relationship with respect to the central plate section 8c of the body 8 of the support beam member 2.

Figure 4B:
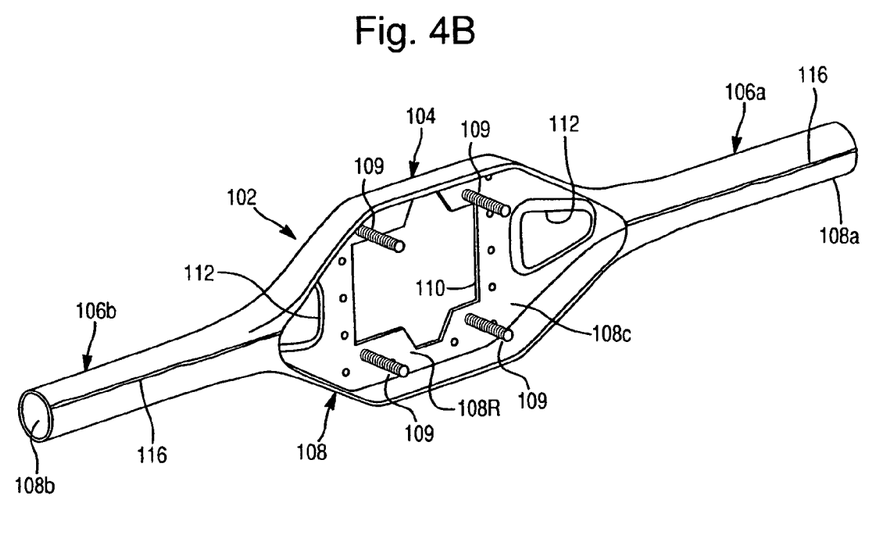
FIG. 4B is a perspective view of a support beam member of the axle assembly in accordance with the second exemplary embodiment of the present invention.

FIG. 4B depicts a second exemplary embodiment of a support beam member indicated with the reference numeral 102 in accordance with the second exemplary embodiment of the present invention. As was explained above, the support beam member 102 has a substantially flat, enlarged central section 104 and two opposite arm sections 106a and 106b axially outwardly extending from the central section 104. Preferably, in this embodiment, the support beam member 102 is formed of a single-piece C-channel body 108 manufactured by a metal deforming, such as stamping, having a substantially flat, enlarged central section 108c and two opposite arm sections 108a and 108b axially outwardly extending from the central section 108c.

The substantially flat, enlarged central section 108c of the body 108 defines the central section 104 of the support beam member 102. The flat enlarged central section 108c is further provided with a central opening 110 therethrough adapted for receiving the differential carrier frame member 22 of the differential assembly 20. A plurality of threaded mounting studs 109 are fixed to a rear mounting surface $108_R$ of the central plate portion 108c, in combination with complementary internally threaded nuts (not shown). The mounting studs 109 extend rearwardly from the rear mounting surface $108_R$ of the central plate section 108c. Preferably, the mounting studs 109 extend substantially orthogonally to the rear mounting surface $108_R$ of the central plate portion 108c.

The arm sections 108a and 108b of the C-channel body 108 are plastically deformed to form a substantially cylindrical arm sections 106a and 106b with seam welds 116 along a neutral axis of the thereof. The cylindrical arm sections 106a and 106b of the support beam member 102 houses the axle shaft members 14a and 14b (not shown in FIG. 4B) in a spaced relationship with respect to the flat central section 108c of the body 108 of the support beam member 102. Those of ordinary skill in the art will appreciate that arm sections 106a and 106b may have many other shapes that could be used for the same purpose, such as elliptical. Thus, the support beam member 102 is formed of a single-piece C-channel body 108.

Figure 6:
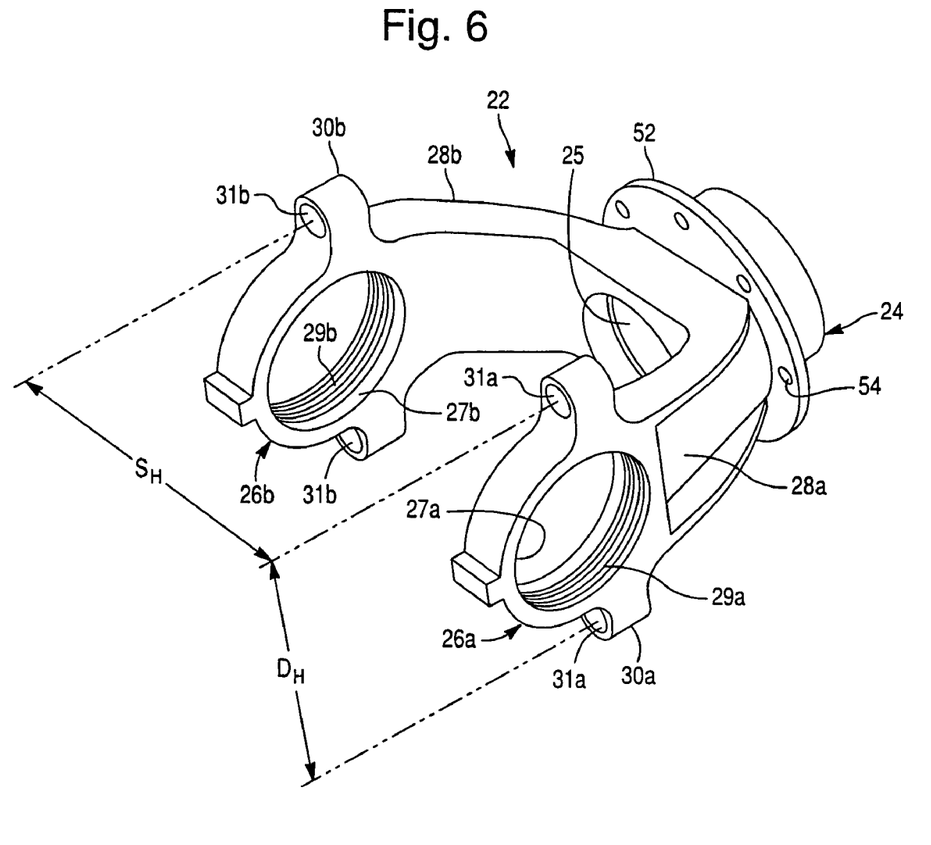
FIG. 6 is perspective view of a differential carrier frame member in accordance with the present invention.

The differential carrier frame member 22, illustrated in detail in FIG. 6, is, preferably, a single-piece metal part manufactured by casting or forging. The differential carrier frame member 22 has a generally Y-shaped configuration and includes a neck portion 24 and two opposite, axially spaced, coaxial bearing hub portions 26a and 26b attached to the neck portion 24 through respective leg portions 28a and 28b. The neck portion has an opening 25 therethrough adapted for receiving and rotatably supporting the drive pinion 38 through an appropriate anti-friction bearing (not shown), preferably a tapered roller bearing. The bearing hub portions 26a and 26b are provided with respective openings 27a and 27b therethrough adapted for receiving appropriate anti-friction bearings 35a and 35b for rotatably supporting the differential case 34. Moreover, an inner peripheral surface of each of the openings 27a and 27b has threads 29a and 29b (as shown in detail in FIG. 6) provided to engage the threads 33 of the threaded adjusting ring 32a or 32b, respectively. Each adjusting ring 32a or 32b is threadedly engaged with the threaded openings 27a and 27b in the bearing hub portions 26a and 26b of the differential carrier frame member 22. Also, each of the bearing hub portions 26a and 26b has associated therewith a locking key 26' which is fastened to the bearing hub portion by any appropriate means known in the art, such as a threaded screw 26", as illustrated in FIG. 5.

For adjustment and preloading of the differential bearings 35a and 35b, as illustrated in detail in FIG. 7, the adjusting rings 32a and 32b will be rotated by the tool so as to move them in or out of openings 27a and 27b in the bearing hub portions 26a and 26b of the differential carrier frame member 22 to selectively vary the position of the adjusting rings 32a and 32b 9 relative to the differential carrier frame member 22 in order to vary a pressure applied to the differential bearings 35a and 35b, thus selectively adjusting the preload of the differential bearings 35a and 35b, and to adjust the position of the differential case 34 relative to the carrier frame member 22. In a fully assembled condition of the differential assembly module 20, the differential bearings 35a and 35b are properly preloaded to a predetermined preload in accordance with vehicle manufacturer's specifications.

Preferably, the anti-friction bearings 35a and 35b are tapered roller bearings. Moreover, the bearing hub portions 26a and 26b are provided with mounting flange portions 30a and 30b respectively, for fastening the differential carrier frame member 22 to the flat central plate section 4 of the support beam member 2. Preferably, each of the mounting flange portions 30a and 30b has two mounting bores 31a and 31b, respectively, adapted to receive the mounting studs 9.

The fully assembled differential assembly module 20 is secured to the support beam member 2 by mounting the differential carrier frame member 22 to the central plate section 4 of the beam member 2 through the mounting studs 9 extending through the mounting bores 31a and 31b in the differential carrier frame member 22, and fastening it to the central plate section 4 of the support beam member 2 with the complementary nuts 13. It will be appreciated that a geometric location of the mounting studs 9 is substantially complementary to location the mounting bores 31a and 31b of the mounting flange portions 30a and 30b of the differential carrier frame member 22 when the anti-friction bearings 35a and 35b mounted to the differential carrier frame member 22 are properly preloaded to the predetermined preload.

More specifically, as shown in FIG. 6, geometric centers of the mounting bores 31a and 31b of the mounting flange portions 30a and 30b of the differential carrier frame member 22 (without the preloaded differential bearings 35a and 35b mounted thereto) are axially spaced to a first distance $S_H$. As the differential case 34 is mounted to the differential carrier frame member 22 through the differential bearings 35a and 35b and the differential bearings 35a and 35b are properly preloaded, the distance between the geometric centers of the mounting bores 31a and 31b of the mounting flange portions 30a and 30b of the differential carrier frame member 22 increases to a second distance $S_{HP}$, as shown in FIG. 8 (only the differential carrier frame member 22 of the differential assembly module 20 is shown, the differential case 34 and the differential bearings 35a and 35b are omitted for clarity).

Figure 8:
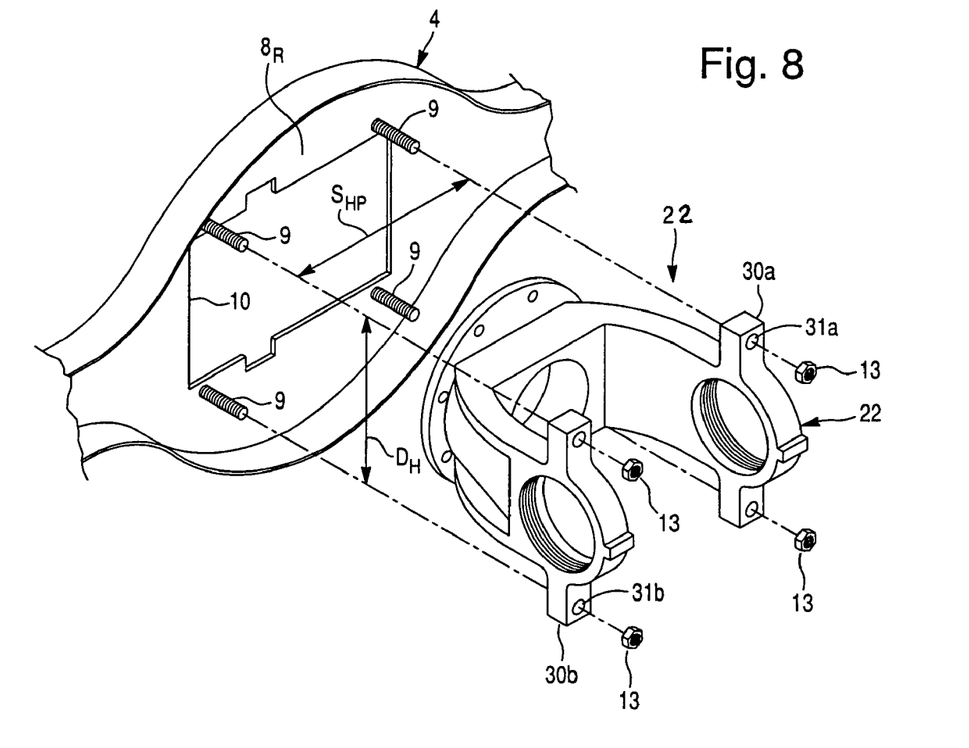
FIG. 8 is a partial exploded perspective view from the rear of the axle assembly in accordance with the preferred embodiment of the present invention.

As noted above, in accordance with the present invention a geometric location of the mounting studs 9 is substantially complementary to location the mounting bores 31a and 31b of the mounting flange portions 30a and 30b of the differential carrier frame member 22 in a preloaded condition, i.e.

an axial distance between geometric centers of the mounting studs 9 in a transverse direction substantially corresponds to the second distance $S_{HP}$ between the geometric centers of the mounting bores 31a and 31b of the mounting flange portions 30a and 30b of the differential carrier frame member 22 when the differential bearings 35a and 35b are properly preloaded to the predetermined value in accordance with the vehicle manufacturer's specifications (as shown in FIG. 8). Please note that only the differential carrier frame member 22 of the differential assembly module 20 is shown in FIG. 8, the differential case 34 and the differential bearings 35a and 35b are omitted for clarity.

A distance between geometric centers of the mounting studs 9 in a vertical direction substantially corresponds to a distance $D_H$ between the geometric centers of the mounting bores 31a of the mounting flange portion 30a and the mounting bores 31b of the mounting flange portion 30b of the differential carrier frame member 22. The distance $D_H$ is not affected by the preloading force acting to the mounting flange portions 30a and 30b of the differential carrier frame member 22.

As further illustrated in FIG. 6, the neck portion 24 of the differential carrier frame member 22 has a substantially annular flange member 52 provided with a plurality of holes 54 spaced apart substantially circumferentially, equidistantly around the flange member 52. Preferably, the holes 54 are threaded. It will be appreciated that a geometric location of the through holes 54 is substantially complementary to location the through holes 49' of the front flange collar 49a of the front cover 46.

The preferred embodiment of a method of assembling the rigid drive axle assembly 1 in accordance with the present invention is performed in the following manner.

First, the differential assembly module 20 is assembled by mounting and securing the differential case 34 housing a differential gear mechanism and the drive pinion 38 to the differential carrier frame member 22. The input yoke 39 is attached to the distal end of the drive pinion 38 by any appropriate means well known in the art, such as spline connection, and secured by a threaded nut 39a. The differential bearings 35a and 35b are preloaded by the adjusting rings 32a and 32b to a predetermined bearing preload in accordance with a manufacturer's specification. Differential bearings supporting the drive pinion 38 are also preloaded.

Figure 9:
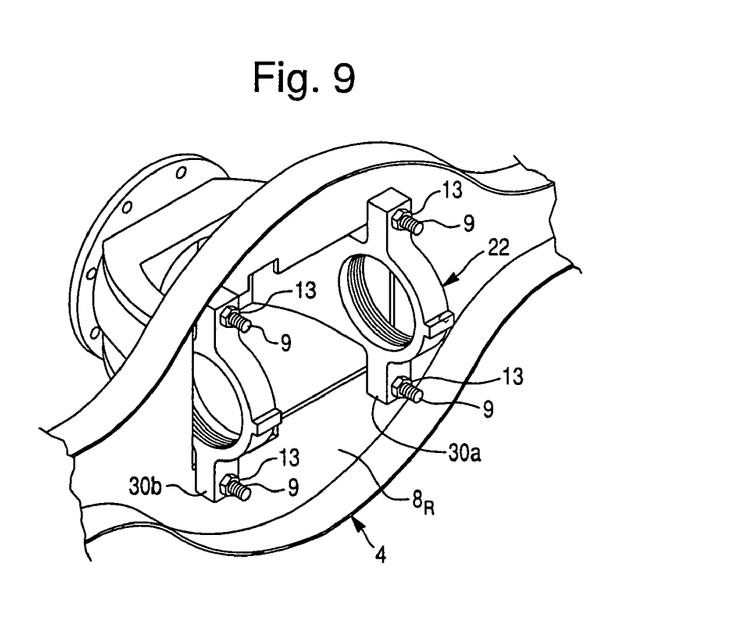
FIG. 9 is a partial perspective view from the rear of the axle assembly in accordance with the preferred embodiment of the present invention.

Then, the fully assembled and preloaded differential assembly module 20 is mounted to the support beam member 2 by fastening the differential carrier frame member 22 to the rear mounting surface $8_R$ of the support beam member 2 so that the neck portion 24 of the differential carrier frame member 22 extends through the opening 10 in the central plate section 4 of the support beam member 2. More specifically, the mounting flange portions 30a and 30b of the differential carrier frame member 22 are fastened to the rear mounting surface $8_R$ of the enlarged, central plate section 8c of the body 8 of the support beam member 2 by inserting the mounting bores 31a and 31b of the mounting flange portions 30a and 30b of the differential carrier frame member 22 over the mounting studs 9 to extend them through the mounting bores 31a and 31b in the differential carrier frame member 22, then fastening to the central plate section 4 of the beam member 2 with the complementary nuts 13. Please note that only the differential carrier frame member 22 of the differential assembly module 20 is shown in FIGS. 8 and 9, the differential case 34 and the differential bearings 35a and 35b are omitted for clarity.

It will be appreciated by those skilled in the art that if the differential bearings 35a and 35b are preloaded properly to the appropriate, predetermined preload in accordance with the manufacturer's specification, then the mounting studs 9 are received in the mounting bores 31a and 31b in the differential carrier frame member 22 easily, without substantial resistance or interference to advancing the differential carrier frame member 22 along the mounting studs 9 toward the central plate portion 8c.

On the other hand, if the mounting studs 9 cannot be received in the mounting bores 31a and 31b in the differential carrier frame member 22 simultaneously, or if the differential carrier frame member 22 encounters substantial resistance to its advancing along the mounting studs 9 toward the central plate portion 8c during the process of mounting over the mounting bores 31a and 31b, then the differential bearings 35a and 35b are not preloaded properly to the appropriate, predetermined value in accordance with the manufacturer's specifications.

Thus, the predetermined bearing preload of the differential bearings 35a, 35b in the differential assembly module 20 could be readily and conveniently verified.

Next, the front cover 46 is placed over the neck portion 24 of the differential carrier frame member 22 of the differential assembly module 20 so that the distal end of the pinion shaft 38b of the drive pinion 38 of the differential assembly module 20 extends through the opening 48 in the front cover 46 and the front flange collar 49a of the front cover 46 is juxtaposed to the annular flange member 52 of the neck portion 24 of the differential carrier frame member 22. Then, the front flange collar 49a of the front cover 46 is fastened to the annular flange member 52 of the neck portion 24 of the differential carrier frame member 22 by a plurality of screws 47 extending through the through holes 49' of the front flange collar 49a of the front cover 46 and threaded into the threaded holes 54 in the annular flange member 52 of the neck portion 24 of the differential carrier frame member 22. Subsequently, the front cover 46 is secured to the central plate section 8c of the C-channel body 8 of the support beam member 2 by welding the rear flange 49b of the front cover 46 to the front mounting surface $8_F$ of the central plate section 8c. It will be appreciated that any other techniques of securing the front cover 46 to the front mounting surface $8_F$, such as adhesive bonding, bolting, riveting, etc., is within the scope of the present invention.

Therefore, the process in accordance with the present invention represents a novel method for verifying a predetermined bearing preload of a differential assembly module mounted to an axle support beam member of a drive axle. The present invention considerably simplifies assembling of the drive axle, reduces labor cost and improves the quality of the final product.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for verifying a predetermined bearing preload of differential bearings in a differential assembly module during the mounting thereof to an axle support beam member of a drive axle assembly, said axle support beam member having a central section and at least two mounting studs outwardly extending therefrom, said differential assembly module including a differential carrier frame member having two axially spaced bearing hub portions each provided for receiving one of said differential bearings for rotatably supporting a differential case, each of said bearing hub portions of said differential carrier frame member having at least one mounting bore for receiving one of said at least two mounting studs of said support beam member, an axial spacing between said at least two mounting studs being complementary to a spacing between said mounting bores in said bearing hub portions when said differential bearings are properly preloaded to said predetermined bearing preload, said method comprising the steps of:
a) providing said differential carrier frame member;
b) mounting one of said differential bearings to each of said bearing hub portions of said differential carrier frame member and a differential case rotatably supported by said differential bearings;
c) preloading each of said differential bearings to said predetermined bearing preload;
d) providing said support beam member;
e) inserting said mounting studs of said axle support beam member into said mounting bores in said bearing hub portions of said differential carrier frame member; and
f) determining that said differential bearings are properly preloaded if said mounting studs are received in said mounting bores in said differential carrier frame member without substantial interference; or
g) determining that said differential bearings are not properly preloaded if said mounting studs may not be received in said mounting bores in said differential carrier frame member or if said mounting studs are received in said mounting bores in said differential carrier frame member with substantial interference.

2. The method for verifying said predetermined bearing preload of said differential bearings as defined in claim 1, wherein said at least two mounting studs extend substantially orthogonally to a rear mounting surface of said central section of said support beam member.

3. The method for verifying said predetermined bearing preload of said differential bearings as defined in claim 1, further including the step of fastening said differential carrier frame member to said central section by threaded nuts complementary to said at least two mounting studs subsequent to the step of determining that said differential bearings are properly preloaded.

4. The method for verifying said predetermined bearing preload of said differential bearings as defined in claim 3, wherein said central section of said support beam member has an opening therethrough, wherein said differential carrier frame member further includes a neck portion for rotatably supporting a drive pinion and two opposite leg portions each provided with one of said bearing hub portions, and wherein said differential carrier frame member of said differential assembly module is fastened to a rear mounting surface of said central section of said support beam member so that said neck portion of said differential carrier frame member extends through said opening in said support beam member.

5. The method for verifying said predetermined bearing preload of said differential bearings as defined in claim 1, wherein said central section of said support beam member has an opening therethrough and substantially flat front and rear mounting surfaces, and wherein said at least two mounting studs outwardly extend from said rear mounting surface of said central plate section of said support beam member.

6. The method for verifying said predetermined bearing preload of said differential bearings as defined in claim 1, wherein said axle support beam member has two pairs of said mounting studs outwardly extending from said central section of said axle support beam member, and wherein each of said bearing hub portions of said differential carrier frame member has one pair of said mounting bores.

7. The method for verifying said predetermined bearing preload of said differential bearings as defined in claim 1, wherein each of said bearing hub portions of said differential carrier frame member is provided with a mounting flange portion provided with said at least one mounting bore.

8. The method for verifying said predetermined bearing preload of said differential bearings as defined in claim 1, further including the step of adjusting said differential bearing preload subsequent to the step of determining that said differential bearings are not properly preloaded.

9. A method for verifying a predetermined bearing preload of differential bearings in a differential assembly module during the mounting thereof to an axle support beam member of a drive axle assembly; said axle support beam member including a central section having an opening therethrough, substantially flat front and rear mounting surfaces and two pairs of mounting studs extending substantially orthogonally outwardly from said rear mounting surface of said central section of said support beam member; said differential assembly module including a differential carrier frame member having a neck portion and two bearing hub portions for receiving said differential bearings for rotatably supporting a differential case and having axially spaced mounting flange portions; each of said mounting flange portions having a pair of mounting bores for receiving one of said two pairs of mounting studs of said support beam member; an axial spacing between said two pairs of mounting studs is complementary to a spacing between said pairs of mounting bores in said bearing hub portions when said differential bearings are properly preloaded to said predetermined bearing preload, said method comprising the steps of:
a) providing said differential carrier frame member;
b) mounting one of said differential bearings to each of said bearing hub portions of said differential carrier frame member and said differential case rotatably supported by said differential bearings;
c) preloading each of said differential bearings to said predetermined bearing preload in accordance with the manufacturer's specification;
d) providing said support beam member;
e) inserting said mounting studs into said mounting bores in said bearing hub portions of said differential carrier frame member; and
f) fastening said differential carrier frame member to said central section by threaded nuts complementary to said mounting studs if said mounting studs are received in said mounting bores in said differential carrier frame member without substantial interference
g) adjusting said differential bearing preload if said mounting studs may not be received in said mounting bores in said differential carrier frame member or if said mounting studs are received in said mounting bores in said differential carrier frame member with substantial interference; and h) fastening said differential carrier frame member to said central section by said threaded nuts if said mounting studs are received in said mounting bores in said differential carrier frame member without substantial interference subsequent to the step of adjusting said differential bearing preload.

10. A method for assembling a drive axle assembly of a motor vehicle, said drive axle assembly comprising a support beam member and a differential assembly module, said method comprising the steps of:

a) providing said support beam member having a central section and at least two mounting studs outwardly extending therefrom;

b) providing said differential assembly module including a differential carrier frame member having two axially spaced bearing hub portions each provided for receiving one of differential bearings for rotatably supporting a differential case, each of said bearing hub portions of said differential carrier frame member having at least one mounting bore for receiving one of said at least two mounting studs of said support beam member, wherein an axial spacing between said at least two mounting studs is complementary to a spacing between said mounting bores in said bearing hub portions when said differential bearings are properly preloaded to a predetermined bearing preload;

c) mounting one of said differential bearings to each of said bearing hub portions of said differential carrier frame member and said differential case rotatably supported by said differential bearings;

d) preloading each of said differential bearings to said predetermined bearing preload;

e) inserting said mounting studs into said mounting bores in said bearing hub portions of said differential carrier frame member;

f) determining that said differential bearings are properly preloaded if said mounting studs are received in said mounting bores in said differential carrier frame member without substantial interference; or g) determining that said differential bearings are not properly preloaded if said mounting studs may not be received in said mounting bores in said differential carrier frame member or if said mounting studs are received in said mounting bores in said differential carrier frame member with substantial interference; and h) fastening said differential carrier frame member to said central section by threaded nuts complementary to said at least two mounting studs subsequent to the step of determining that said differential bearings are properly preloaded.

11. The method for assembling said drive axle assembly as defined in claim 10, wherein said central section has substantially flat front and rear mounting surfaces, and wherein said at least two mounting studs extend from said rear mounting surface.

12. The method for assembling said drive axle assembly as defined in claim 11, further including the step of securing a front cover to said front mounting surface of said central section of said support beam member.

13. The method for assembling said drive axle assembly as defined in claim 11, further including the step of securing a rear cover to said rear mounting surface of said central section of said support beam member.

14. The method for assembling said drive axle assembly as defined in claim 11, wherein said central section of said support beam member has an opening therethrough, wherein said differential carrier frame member further includes a neck portion for rotatably supporting a drive pinion and two opposite leg portions each provided with one of said bearing hub portions for rotatably supporting said differential case, and wherein said differential carrier frame member of said differential assembly module is fastened to said rear mounting surface of said central section of said support beam member so that said neck portion of said differential carrier frame member extends through said opening in said support beam member.

15. The method for assembling said drive axle assembly as defined in claim 10, wherein each of said bearing hub portions of said differential carrier frame member is provided with a mounting flange portion provided with said at least one mounting bore.

16. The method for assembling said drive axle assembly as defined in claim 10, further including the step of adjusting said differential bearing preload subsequent to the step of determining that said differential bearings are not properly preloaded.

17. The method for assembling said drive axle assembly as defined in claim 10, wherein said support beam member of said drive axle assembly further includes two opposite arm sections extending from said central section.

18. The method for assembling said drive axle assembly as defined in claim 17, wherein said central section of said support beam member is enlarged relative to said arm sections.

19. The method for assembling said drive axle assembly as defined in claim 10, wherein said flat central section of said support beam member defines a support plane that is substantially orthogonal to a driving direction of said motor vehicle.

20. The method for assembling said drive axle assembly as defined in claim 10, wherein said axle support beam member has two pairs of said mounting studs outwardly extending from said central section of said axle support beam member, and wherein each of said bearing hub portions of said differential carrier frame member has one pair of said mounting bores.

* * * * *